United States Patent [19]
Taylor, Jr.

[11] Patent Number: 5,404,648
[45] Date of Patent: Apr. 11, 1995

[54] NAVIGATIONAL PLOTTER

[76] Inventor: Ralph A. Taylor, Jr., P.O. Box 159, West Falmouth, Mass. 02574

[21] Appl. No.: 206,389

[22] Filed: Mar. 4, 1994

[51] Int. Cl.$^6$ ............................................. B43L 7/027
[52] U.S. Cl. ......................................... 33/431; 33/563; 33/474
[58] Field of Search ................... 33/1 C, 1 SD, 27.02, 33/27.031, 427, 430, 431, 435, 452, 457, 474, 476, 562, 563, 565

[56] References Cited

U.S. PATENT DOCUMENTS

| | | | |
|---|---|---|---|
| 364,630 | 6/1889 | Bowyer | 33/457 |
| 559,689 | 5/1896 | Dunn | 33/431 |
| 1,289,905 | 12/1918 | Poor | 33/431 |
| 2,512,285 | 6/1950 | Nippert | 33/1 C |
| 2,545,935 | 3/1951 | Warner | 33/1 SD |
| 3,377,706 | 4/1968 | Shrader | 33/431 |
| 3,535,788 | 10/1970 | Sena | 33/457 |
| 4,138,817 | 2/1979 | Frost et al. | 33/431 |
| 5,167,076 | 12/1992 | Sump | 33/431 |

FOREIGN PATENT DOCUMENTS

| | | | |
|---|---|---|---|
| 53605 | 2/1934 | Norway | 33/431 |
| 58433 | 10/1921 | Sweden | 33/431 |
| 22117 | of 1914 | United Kingdom | 33/431 |

OTHER PUBLICATIONS

Micrologic Excellence in Navigation, Explorer GPS Sattelite Navigator, Copyright 1990, 2PE.

*Primary Examiner*—William A. Cuchlinski, Jr.
*Assistant Examiner*—G. Bradley Bennett
*Attorney, Agent, or Firm*—Thomas A. Kahrl

[57] ABSTRACT

A navigational plotter consisting of a triangular shaped navigational plotter, having two angle members and a rounded third corner employing a compass rose and a central orientation point for use as a navigation aid in combination with LORAN computerized navigational system or alternative Global Positioning Navigational Systems. This navigational plotter enables a navigator to easily locate the position of his ship on a chart by using input from the LORAN/GPS systems and by the use of this true course chart calculator which provides a course for checking the computerized course information and assists in avoiding obstacles in the path of travel not shown by the LORAN or GPS systems. When used with a LORAN or GPS system, the navigational plotter allows the navigator to plot a course on a chart or map and then to quickly locate the current position, orient the plotter correctly and get an overview of the true course.

14 Claims, 3 Drawing Sheets

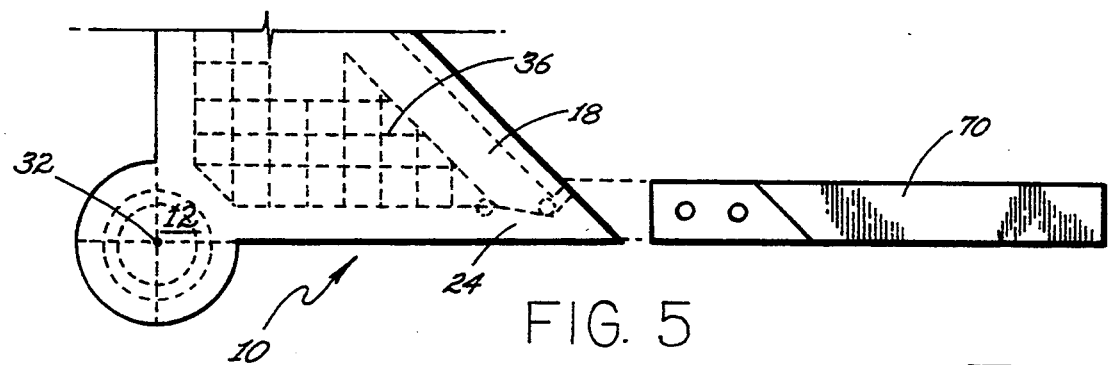
FIG. 5
FIG. 6
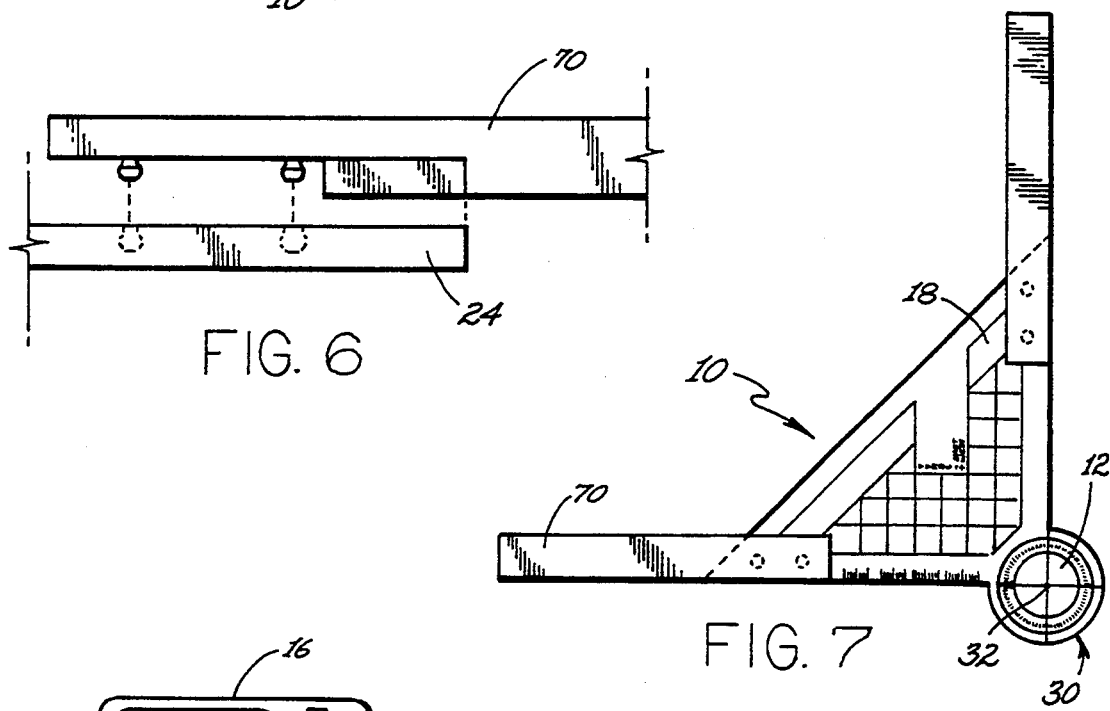
FIG. 7
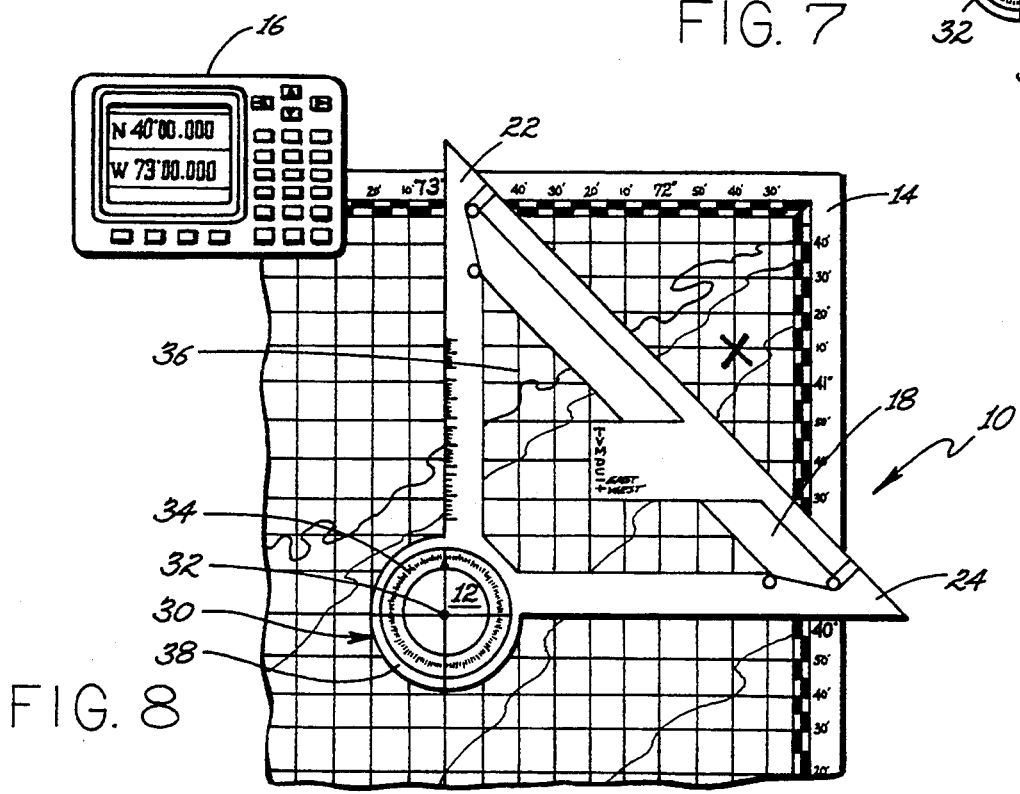
FIG. 8

NAVIGATIONAL PLOTTER

BACKGROUND OF THE INVENTION

The present invention relates to a navigational plotter and more particularly to a navigational aid employing a triangular plotter having pin-hole centered in a compass rose for plotting a true course on a chart or map.

The popular means of establishing a true course on deep water craft has been through use of a LORAN navigational system which gives a current position, finds a destination plot and computes a true course to follow, commonly all without reference to a chart or map. The most commonly used device for establishing a true course heading on a chart is a parallel ruler. The parallel ruler typically comprises a pair of straight edges arranged in parallel relationship by a pair of diagonal arms which are typically employed to move a course line, plotted on a chart or map, to a compass rose printed on said chart or map. Employment of this device involves first aligning one of the edges with a course line plotted on a chart. Then the straight edges are sequentially moved across the chart by alternately fixing one edge and moving the other relative to the initial fixed edge until one of the edges is aligned with the center of a compass rose on the chart. The heading would then be taken from the compass rose. This process necessarily involves relative slippage between the straight edges and the chart in the transferring of the parallel ruler across the chart. This may cause error in a plot. The amount of error is in direct relation to the amount of skill, the degree of care exercised and the amount of time expended. Also, the use of parallel rulers for establishing true course is typically accompanied by the use of dividers to determine distance by reference to the appropriate distance scale on the chart or map. Both instruments are adapted for use by a skilled navigator in a chart room on a large chart table rather than by a conning navigator in an open bridge or cockpit when underway.

Prior art navigational instruments used for determining true course heading on charts typically have been mechanically complicated, inconvenient to use, and more importantly, inaccurate when used at sea. Applicant is aware of prior art devices for calculating true course on a chart. Such prior art devices include the following U.S. Pat. Nos.:

| | | | |
|---|---|---|---|
| 364,630 | BOWER | 3,377,706 | SHRADER |
| 1,289,905 | POOR | 3,535,788 | SENA |
| 2,545,935 | WARNER | 4,138,817 | FROST ET AL. |

While each of the references show some feature of the inventive combination, i.e., U.S. Pat. No. 4,138,817 Frost et al. shows a navigational aid used in conjunction with a map, the prior art references do not show a triangular plotter having a pin-hole centered in a compass rose for fixing a position with a sharp tipped drawing instrument nor do they integrate information furnished by a LORAN or GPS (Global Positioning System) navigational system to translate that information onto a chart to show the true course on the chart in relation to navigational hazards.

Accordingly, it is desirable to provide for a new and improved Navigational Plotter which is, quick, accurate and simple to operate (with a minimum of moving parts) which provides a cross-reference for Loran or GPS by displaying an independent course plot on a chart and which overcomes at least some of the disadvantages of prior art.

SUMMARY OF THE INVENTION

The invention relates to a navigational plotter apparatus for accurately plotting positions and courses on a chart or map. In particular the invention relates to a navigational aid employing a triangular plotter having a pin-hole centered in a compass rose for plotting a position and for use with an electronic navigational system, such as LORAN or GPS, for determining a true course heading on a chart or map from navigational data provided by the electronic system.

The present invention concerns a triangular shaped navigational plotter having two acute angle corners and a rounded third corner. Said third corner has a centrally positioned pin-hole surrounded by the compass rose adapted to be used in combination with a pin member consisting of a marking instrument having a sharp point for finding a position, fixing the alignment of the plotter, marking a position on the chart and for plotting a course. The navigational plotter is used in combination with a conventional chart or map to determine the path of travel and thus assist in avoiding obstacles.

The present invention relates in particular to a navigational plotter consisting of an indicia member and a pin member for plotting a true course on a chart or map. The present invention comprises a triangular shaped plotter constructed of transparent material including a right angle contained within the compass rose at the third corner. Said plotter also includes two acute angle corners configured to intersect meridian scales of Longitude and Latitude on a chart, typically a nautical chart. Said plotter includes a first acute angle corner, a second acute angle corner and a rounded third corner. The rounded third corner includes a central pin hole for indexing the plotter and includes indicia comprising a compass rose surrounding the pin hole provided integrally at the radial center of the rounded corner. The plotter also includes an internal grid means marked on the transparent body of the plotter that is used for aligning the plotter with Latitude and Longitude meridians of the chart eliminating the need to use the outer edges of the plotter.

In the present invention the plotter includes a first edge extending between the first acute angle corner and the rounded corner and a second edge extending between the second acute angle corner and the rounded corner. The second edge is in orthogonal relation to the first edge. Extensions of the first and second edges intersect orthogonally at the radial center of the rounded corner. A first diameter indicia is provided extending from the first edge and intersecting a second diameter at a right angle at the radial center which is positioned coexistive with the pin hole. The plotter also includes a third edge extending between the first acute angle corner and the second acute angle corner. The third edge consists of the hypotenuse of a right triangle. The third edge includes a distance calculation strip means and a compass variation calculator means. In practice, a distance of a time course line is marked on the distance calculation strip and is then compared with the distance scale on the chart itself.

The present invention further includes a marking device for insertion throughout the pin-hole position for fixing a location on a chart with a sharp point and marking it with a pencil means. The location is fixed by positioning the pin-hole on a chart and then by aligning the first and second edges (arranged in orthogonal relationship) with the latitude and longitude meridian scales (also arranged in orthogonal relationship), which are located on the sides of the chart. This operation is quick, simple, and accurate as no movement of the plotter is needed which might cause slippage.

The navigational plotter of the present invention may also be used in combination with a chart/map and an electronic navigational system such as LORAN or GPS (Global Positioning System). Water craft navigators commonly use Loran navigational system and more recently use Global Positioning System (GPS) navigational system which receives GPS satellite signals and then displays a vessel's position in latitude and longitude revealing speed and course heading off-set, range and bearing, from any present position to any waypoint. Inasmuch as the electronic system does not show navigational hazards, the plotter allows the navigator to determine the path of travel on a chart or map and thus assists in avoiding obstacles. The plotter allows the navigator to plot a course on the chart or map, to quickly locate his current position, and get an overview of the course.

Additional details are presented in the disclosure materials.

When using this instrument with Loran or GPS, the following items should be noted that will simplify all navigational objectives:

1. The plotter will allow you to position yourself on a chart.
2. The plotter eliminates the need for parallel rule and dividers.
3. The plotter has no moving parts, is sturdy, and provides pinpoint accuracy.
4. The plotter will give LORAN or GPS position to go to.
5. The plotter will provide course to steer (backup).
6. The plotter will give you distance to go (backup).
7. The plotter will supply LORAN time-difference scale.

It is therefore evident that operation of the navigational plotter of the present invention enables a navigator to easily locate the position of his vessel on a chart by the use of input of longitude and latitude obtained from a navigational electronic system such as LORAN or GPS. It also enables a navigator to locate a destination position (way point) on a chart, provides input to the Loran or GPS system, and obtains an output from said system giving a course and speed to the destination point. The navigational plotter further enables the navigator to locate course to a destination point. By using the known position of his vessel, a navigator can determine a course to a desired destination point as a cross check to the output received from the LORAN or GPS system. Furthermore, the navigational plotter of the present invention eliminates the need for parallel rules and dividers to locate positions, to lay out courses and to compute distances to be travelled.

The present invention is based upon the well known grid system characterized by the perpendicular relationship of longitude and latitude meridians. The invention employs a large right triangle, is constructed of transparent material, and includes a compass rose scale located at the right triangle's corner. The compass rose scale has a radial center that is coexistive with a locating pin hole. Said pin hole permits direct location of a position from any coordinate of longitude and latitude in a quick and accurate manner, with no slippage causing error. The novel feature of surrounding the locator pin hole with a compass rose scale is a key element of the invention. When it is placed in direct alignment with the meridians and it effectively brings the compass rose to the current position and course line for a simple accurate reading. The simplicity of the design and operation of the invention is such that it does not require special navigational training. Thus, the invention is adapted for use in recreational boats where the operators have a limited amount of navigational experience or training.

A particular application of this invention is to use the navigational plotter as a cross reference to a course and speed produced by a electronic navigational system such as LORAN or GPS. Such electronic navigational systems receive input of a current position and a waypoint and then furnish a course and speed to the intended destination point. The navigational plotter of the present invention can be used to locate the coordinates of the current position and the waypoint to plot a course and compute a speed on a nautical chart itself. Comparing the results given by the electronic navigational system with an actual chart serves as a safety measure.

A further advantage of the present invention is that it quickly and simply locates the ships course on a chart showing whether said course encounters navigational hazards. Such hazards are disclosed only on a navigational chart and are not disclosed on electronic navigational systems such as LORAN or GPS.

The invention will be described for the purposes of illustration only in connection with certain embodiments. However, it is recognized that those persons skilled in the art may make various changes, modifications, improvements and additions on the illustrated embodiments all without departing from the spirit and scope of the invention.

BRIEF DESCRIPTION OF THE DRAWINGS

FIG. 5 is a partial plan view of the plotter of FIG. 1 showing the horizontal arm extender.

FIG. 6 is an expanded cross sectional view of the extender arm showing means of attachment to the plotter.

FIG. 7 is a plan view of the navigational plotter of FIG. 1 with the arms of FIG. 2 and FIG. 3 attached.

FIG. 8 is a plan view of a navigational plotter of FIG. illustrating the manner in which it is located on a chart and a course determined.

DETAILED DESCRIPTION OF THE PREFERRED EMBODIMENT

Figure 1:
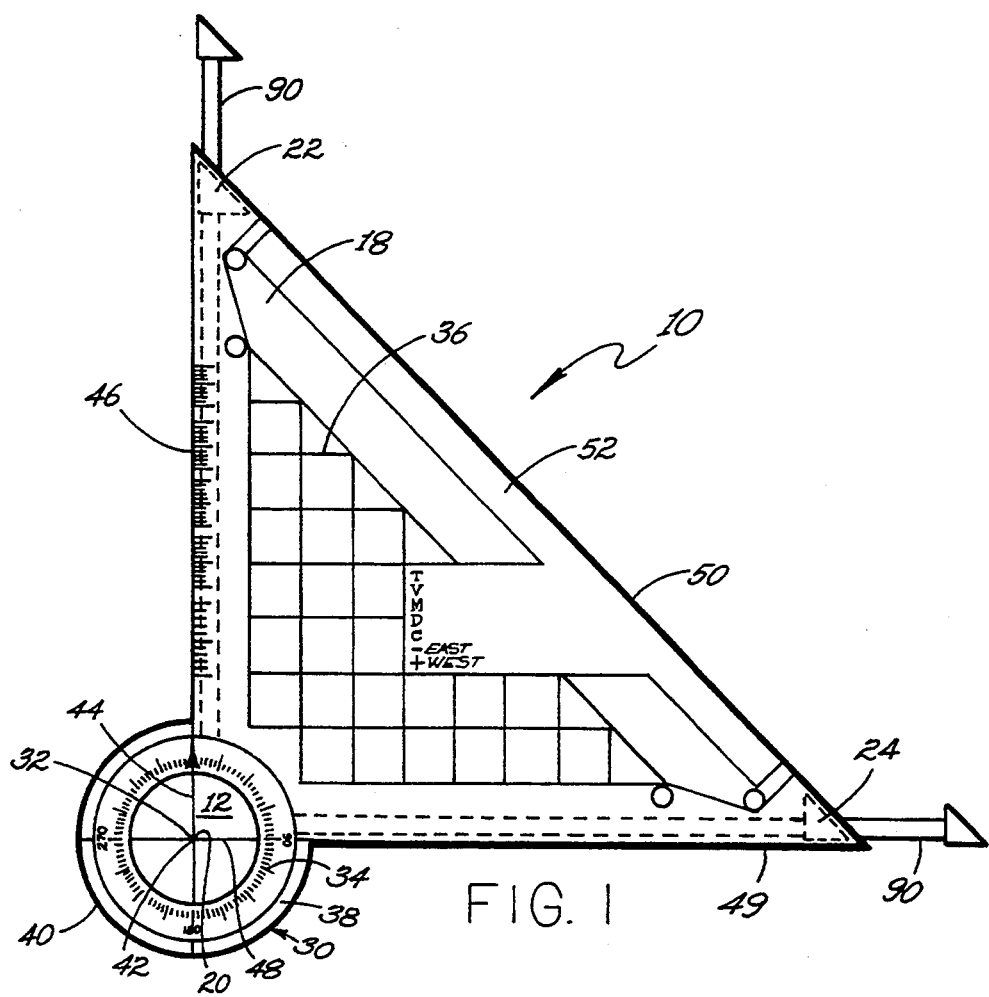
FIG. 1 is a plan view of the navigational plotter according to the present invention.
Figure 2:
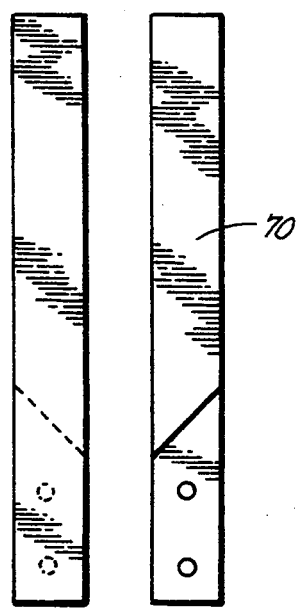
FIG. 2 is a plan view of a left extender arm, front and back, used in connection with the invention of FIG. 1.
Figure 3:
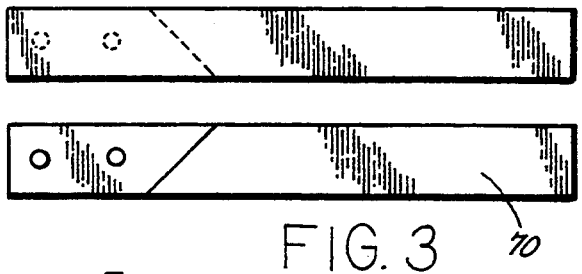
FIG. 3 is a plan view of a right extender arm used in connection with the invention of FIG. 2 showing front and back.

With reference to the drawings, there is shown and illustrated a navigational plotter 10 consisting of a transparent indicia member 12 for use in combination with a chart 14 and electronic navigational device 16 employed for plotting a position, a waypoint and a true course defined by a line between said position and said waypoint on a chart or map. Said navigational plotter 10 consists essentially of a triangular shaped plotter 18 constructed of transparent material including a right angle 20, and having two acute angle corners 22 and 24 configured to intersect latitude meridian scales and longitudinal meridian scales on the chart 14 as is shown in FIG. 8. The triangular shaped plotter 18 includes a first acute angle corner 22 and a second acute angle corner 24 a rounded third corner 30 having a centrally positioned pin hole 32 and including a compass rose indicia 34 provided integrally on the rounded third corner 30.

Also included on the triangular shaped plotter 18, as is shown in FIG. 1 is a grid 36 for aligning said triangular shaped plotter with the conventional latitude and longitude meridians of the chart (typically a nautical chart) wherein the rounded third corner 30 includes a circular corner element 38, which has an arc of 270°) a circular edge 40 and a radial center 42. Said radial center is defined by a first diameter 44 extending from a first edge 46 intersecting a second diameter 48 extending from a second edge 49 at a right angle at the radial center positioned coexistive with the pin hole 32.

Figure 11:
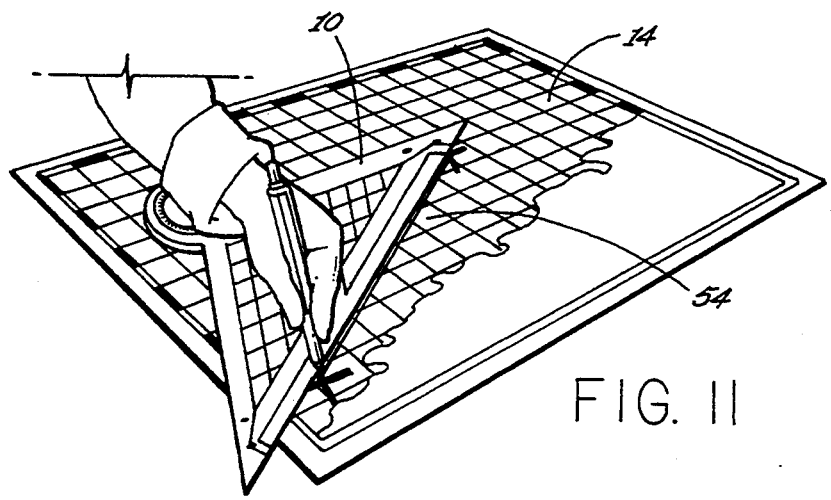
FIG. 11 is a plan view of the navigational plotter of FIG. 1 illiustrating the manner of drawing a course line between two points on a chart.

As shown in FIG. 1 the triangular shaped plotter includes the first edge 46 extending between the first acute angle corner and the third rounded corner 32. The second edge 49 extends between the second acute angle corner and the third rounded corner 32 and is in orthogonal relation to said first edge. A third edge 50 extends between said first acute angle corner and said second acute angle corner. Said third edge, as is shown in FIG. 11, consists of the hypotenuse of a right triangle. Included on said third edge is a distance transfer strip 52 configured for transferring a distance measurement from a true course line 54 to a distance scale on the chart. Said strip consists of an erasable surface. Adjacent to said distance transfer strip 52 is a true course calculator indicia 56 including T, V, M, DC—East and West to compute true course.

Figure 4:
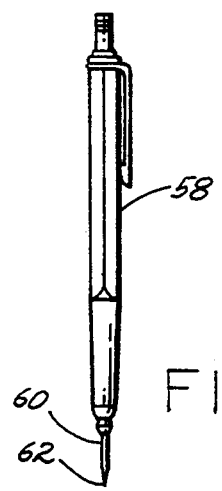
FIG. 4 is a combination pencil/orientation device.

As is shown in FIGS. 4 a marker instrument 58 is shown having a distal shaft 60 and having a sharp tip 62 for extending through the pin-hole 32. This allows for fixing on a chart a position on a chart located by said pin-hole.

Referring to FIG. 8 there is shown a electronic navigational system 16, typically a LORAN or GPS (Global Positioning System), with a display providing input in the form of latitude and longitude.

Figure 9:
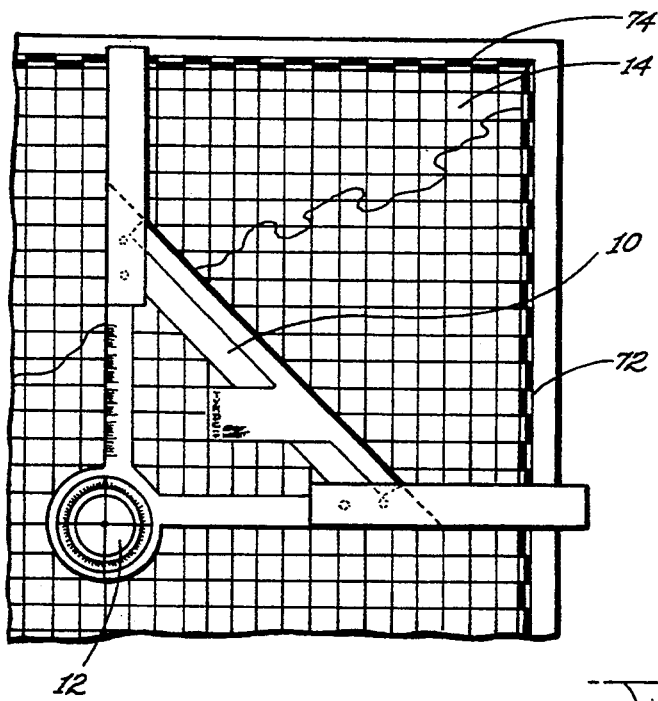
FIG. 9 is a plan view of the navigational plotter of FIG. 1 illustrating the manner of locating a point on a chart.
Figure 10:
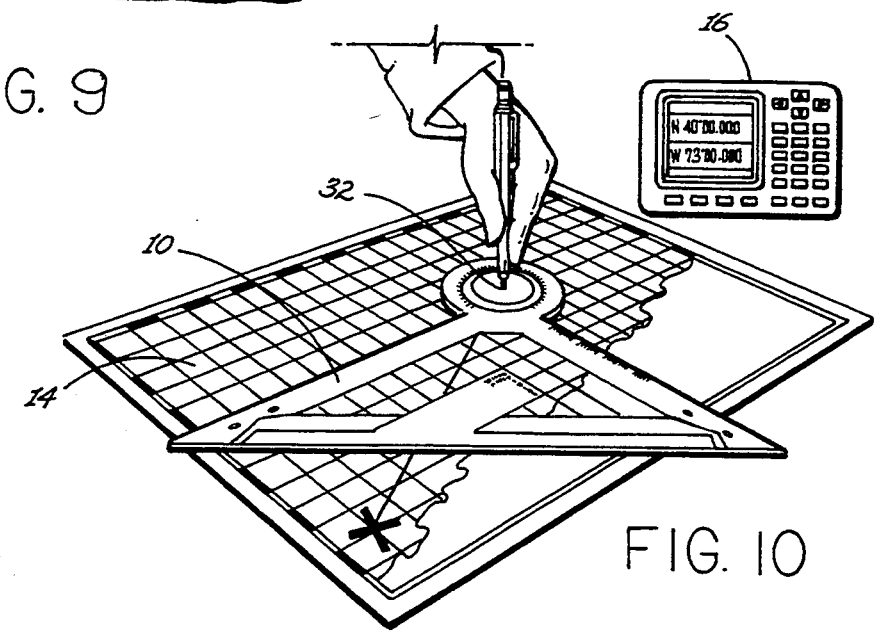
FIG. 10 is a plan view of the navigational plotter of FIG. 8 illustrating the manner of employing a marker instrument having a sharp tip which extends through the plotter to fix a position on a chart.

As is shown in FIG. 9, the a navigational plotter includes elongated extension arms 70 adapted to be releasably connected to one or both of the acute angle corners 22 & 24. Said elongated extension arms selectively extend the first edge 46 and the second edge 49 to reach the latitude meridian scale 72 or the longitudinal meridian scale 74 on the edge of the chart 14 as needed.

An alternate embodiment of the elongated extension arm is telescopically extended arms 90 as is shown in FIG. 1.

To use the NAVIGATIONAL PLOTTER, you must first
1. Find your position on the chart and with a pencil, mark your longitude.
2. Hold the point of the marking instrument on the latitude and align with meridian lines.
3. Mark the fixed location of the hole, that is your position.
4. To find the distance and course to waypoint, with a pencil draw a line from your position to the waypoint.
5. Place the straight edge on the course line and mark the read scale on the side of the chart.
6. Put the pin in the hole and place on the course line. Align with median lines and read course.
7. To find new waypoint, put the pin in the hole and place over new way point.
8. Align with meridian.
9. Read the latitude and the longitude.
10. Enter the latitude and longitude into G.P.S or Loran.

What is claimed is:

1. A navigational plotter consisting of a transparent indicia member for use with a marking instrument comprising:
   a) plotter means for plotting a true course on a chart or map comprising a triangular shaped plotter including a right angle having:
      i) two acute angle corners configured to intersect meridian scales on the chart including a first acute angle corner and a second acute angle corner;
      ii) a rounded third corner having a central index pin hole including indicia comprising a compass rose provided integrally on the rounded corner, grid means for aligning the plotter means with latitude and longitude meridians of a chart;
      iii) a first edge extending between the first acute angle corner and the rounded corner;
      iv) a second edge extending between the second acute angle corner and the rounded corner in orthogonal relation to the first edge; and
      v) a third edge extending between the first acute angle corner and the second acute angle corner consisting of the hypotenuse of a right triangle including a distance calculation strip means and compass variation calculator means;
   b) pin means for fixing a position on a chart located by the central index pin-hole wherein the navigational plotter means is used in combination with a conventional chart or map and LORAN or GPS (Global Positioning System), the plotter means allows the navigator to determine the path of travel and thus assist in avoiding obstacles in the path of travel, to plot a course on the chart or map, to quickly locate the current position, orient the plotter means correctly, and get an overview of the course.

2. The navigational plotter of claim 1 wherein the plotter means includes extension means comprising elongate arms adapted to be releasably connected to the acute angle corners for selectively extending the first edge and second edge to reach the meridian scale on the edge of the chart as needed.

3. The navigational plotter of claim 2 wherein the extension means comprises elongated arms adapted to be telescopically attached to the acute angle corners.

4. The navigational plotter of claim 1 wherein the pin means comprises a mechanical pencil device having an extendable lead forming a sharp tip mounted in a sleeve configured to pass through the position pin-hole to fix the plotter means to the chart or map and mark the point with a pencil mark.

5. The navigational plotter of claim 1 wherein the indicia further comprises LORAN grid means for calculating time deviation.

6. The navigational plotter of claim 1 wherein the third edge includes a distance transfer strip means for transferring a distance measurement from a true course line to a distance scale means on the chart wherein said strip consists of an erasable surface.

7. The navigational plotter of claim 1 wherein the true course calculator includes a table for correcting the course for CDMVT.

8. The navigational plotter of claim 1 wherein the compass rose means comprises a compass face scale formed on the transparent surface of the plotter means.

9. The navigational plotter of claim 1 wherein the circular corner element comprises a circle having an arc of 270° with a circular edge and a radial center including a first diameter that extends from the first edge and intersects a second diameter in a right angle at the radial center that is positioned coexistive with the pin hole.

10. The navigational plotter of claim 1 wherein the plotter means allows a navigator to determine a true course which avoids hazards in the path of travel.

11. A navigational plotter having a transparent indicia member for use in combination with a chart and a computerized navigational system when plotting a true course comprising:

a) a navigational system such as LORAN or GPS for providing position input defined by latitude, longitude and time delay;

b) plotter means for plotting the position input comprising:

i) two acute angle corners configured to intersect meridian scales on the chart including a first acute angle corner and a second acute angle corner;

ii) a rounded third corner having a central index pin hole including indicia comprising a compass rose provided integrally on the rounded corner, grid means for aligning the plotter means with latitude and longitude meridians of a chart wherein the rounded corner element having an arc of 270° comprised of a radial center with a first diameter that extends from the first edge and intersects a second diameter in a right angle at the radial center that is positioned coexistive with the pin hole;

iii) a first edge extending between the first acute angle corner and the rounded corner;

iv) a second edge extending between the second acute angle corner and the rounded corner in orthogonal relation to the first edge; and v) a third edge extending between the first acute angle corner and the second acute angle corner consisting of the hypotenuse of a right triangle including a distance transfer strip means for transferring a distance measurement from a true course line to a distance scale means on the chart wherein said strip consists of an erasable surface and a calculator means;

c) pin means for fixing a position on a chart located by the central index pin-hole wherein the navigational plotter is used in combination with a conventional chart or map and LORAN or GPS (Global Positioning System), the plotter means allows the navigator to determine the course and thus assist in avoiding obstacles in the path of travel, to plot a course on the chart or map quickly, to locate the current position, orient the plotter means correctly, and get an overview of the course.

12. The navigational plotter of claim 11 wherein the plotter means includes extension means comprising elongate arms adapted to be releasably connected to the acute angle corners for selectively extending the first edge and second edge to reach the meridian scale on the edge of the chart as needed.

13. The navigational plotter of claim 11 wherein the extension means comprises elongated arms adapted to be telescopically attached to the acute angle corners.

14. A method of plotting a true course on the chart or map employing the navigational plotter of claim 1 comprising the steps of:

a.) obtaining input of longitude and latitude from a navigational electronic system such as LORAN or GPS;

b.) obtaining a destination position, or waypoint, on the chart or map;

c) providing input to the LORAN or GPS system and to obtain an output from said system giving a course and speed to this destination point; and d) locating the destination point by use of the navigational plotter on the chart or map using the known position of a vessel to determine a course to the destination point on the chart or map as a cross check to the output from the LORAN or GPS system.

* * * * *